(12) United States Patent
Akai et al.

(10) Patent No.: US 7,329,395 B2
(45) Date of Patent: Feb. 12, 2008

(54) TREATMENT APPARATUS AND TREATMENT METHOD FOR ORGANIC WASTE

(75) Inventors: Yoshie Akai, Kanagawa-ken (JP); Masahiko Oosaki, Kanagawa-ken (JP); Kazuya Yamada, Tokyo (JP); Takao Takada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 10/921,259

(22) Filed: Aug. 19, 2004

(65) Prior Publication Data
US 2005/0054891 A1    Mar. 10, 2005

(30) Foreign Application Priority Data
Aug. 19, 2003   (JP)   ............................. 2003-295480

(51) Int. Cl.
    *B01J 8/02*    (2006.01)
(52) U.S. Cl. ...................... 422/211; 422/234; 422/242; 422/241; 422/291; 588/312; 588/400
(58) Field of Classification Search ................ 422/211, 422/203, 234, 242, 228, 241; 588/205, 905, 588/312, 300, 400; 210/178, 195, 205, 761
See application file for complete search history.

(56) References Cited
U.S. PATENT DOCUMENTS

| 5,081,864 | A | * | 1/1992 | Zaim ........................... 73/49.2 |
| 5,167,930 | A | * | 12/1992 | Fassbender ................. 422/112 |
| 5,552,039 | A |   | 9/1996 | McBrayer, Jr. et al. |
| 5,591,415 | A | * | 1/1997 | Dassel et al. ............... 422/241 |
| 5,843,386 | A | * | 12/1998 | Makino et al. ............. 422/203 |
| 5,932,182 | A | * | 8/1999 | Blaney ....................... 422/240 |
| 6,030,587 | A | * | 2/2000 | Haroldsen et al. .......... 422/208 |
| 6,066,263 | A | * | 5/2000 | Makino et al. ............. 210/774 |
| 6,090,291 | A |   | 7/2000 | Akai et al. |
| 6,352,674 | B2 | * | 3/2002 | Matsubara et al. ........ 422/208 |
| 6,551,719 | B2 | * | 4/2003 | Furuya et al. .............. 428/469 |
| 6,749,816 | B1 | * | 6/2004 | Hasegawa et al. .......... 422/189 |

FOREIGN PATENT DOCUMENTS

JP        2002-028670    *    1/2002

* cited by examiner

*Primary Examiner*—N. Bhat
(74) *Attorney, Agent, or Firm*—Oblon, Spivak, McClelland, Maier & Neustadt, P.C.

(57) ABSTRACT

A treatment apparatus for organic waste including a reaction vessel for introducing and decomposing organic waste and pulling out decomposed organic waste as a treated fluid. The reaction vessel includes an internal vessel made of corrosion-resistant material, an external vessel made of pressure-resistant material provided for surrounding the internal vessel via a gap, and an interconnection pipe for interconnecting the gap and the internal vessel outside the external vessel, thereby to control inside the gap and inside the internal vessel to practically equal pressure. The internal vessel has a heating zone for heating the introduced organic waste to a temperature higher than a critical point of water, a reaction zone for holding and decomposing the organic waste at a temperature higher than the critical point of water, and a cooling zone for cooling the treated fluid containing a decomposition product of the organic waste to lower than 100° C. The gap is adapted to be charged with high-pressure water or hydrogen peroxide water.

18 Claims, 8 Drawing Sheets

| TEMPERATURE | CASE(1):AIR(PRIOR ART) | | CASE(2):WATER(THIS INVENTION) | |
|---|---|---|---|---|
| | VOLUME [ml] | PRESSURE IN GLOVE BOX [Pa] | VOLUME [ml] | PRESSURE IN GLOVE BOX [Pa] |
| 50 °C (AFTER COOLING BY AIR) | 6700 | 600 | 7.4 | 0.73 |
VOLUME OF WATER IS CALCULATED AS IT IS ASSUMED THAT PRESSURE IS 30MPa AND DENSITY OF WATER UNDER 450°C, 30MPa IS 0.148g/ml
FIG. 3
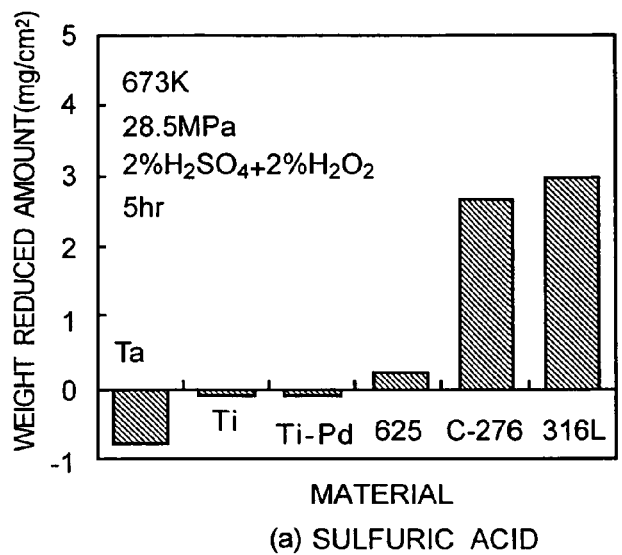
(a) SULFURIC ACID
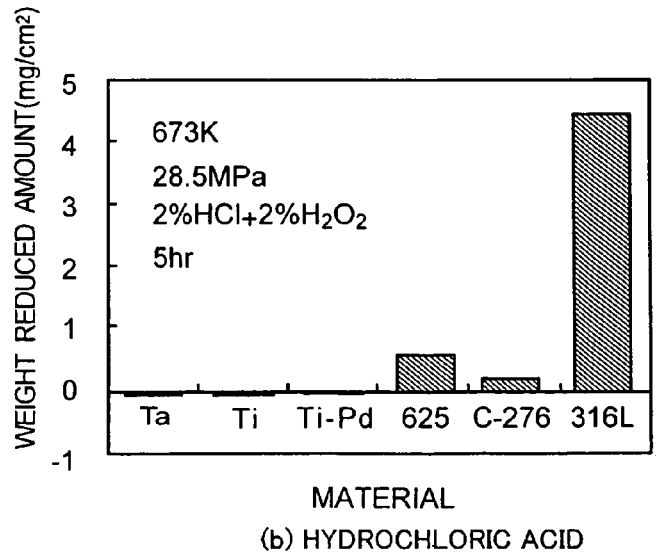
(b) HYDROCHLORIC ACID
FIG. 4

| OXIDIZING AGENT | WASTE LIQUID GENERATION AMOUNT |
|---|---|
| HYDROGEN PEROXIDE WATER | 29 TIMES |
| AIR* | 0.7 |
IN CASE OF AIR TREATMENT, WATER THE AMOUNT OF WHICH IS TEN TIMES THAT OF BENZENE IS ADDED FOR MAKING SUPERCRITICAL WATER CONDITION. WATER IS USED REPEATEDLY.
FIG. 11
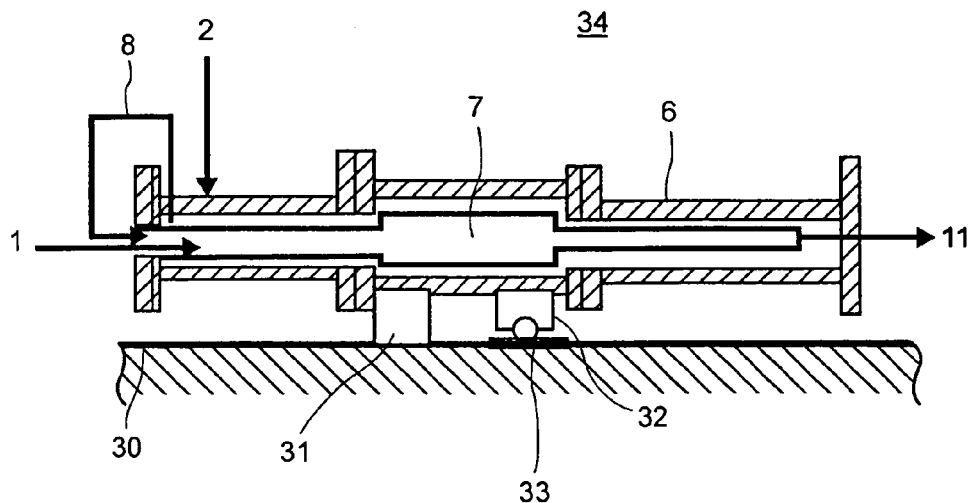
FIG. 12
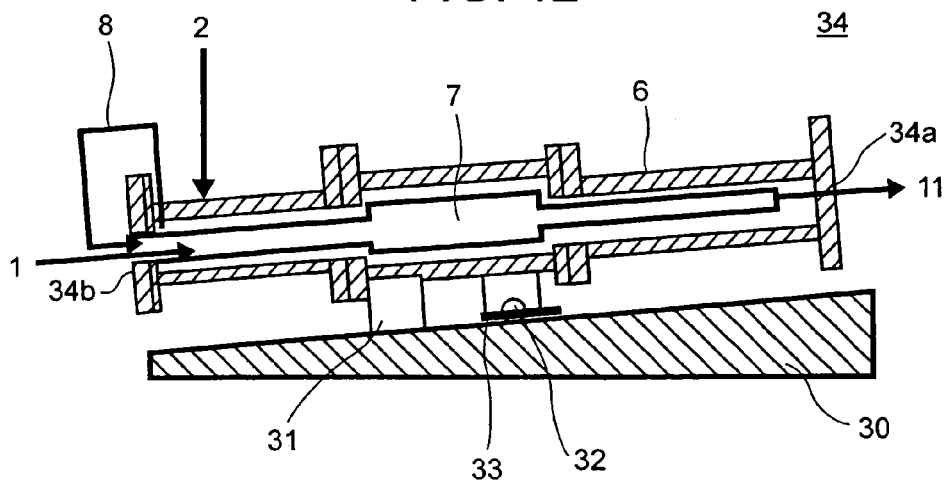
FIG. 13

| ADDED AMOUNT OF SODIUM HYDROXIDE/COCKTAIL [WEIGHT PERCENTAGE] | DECOMPOSITION RATE [%] |
|---|---|
| NONE | 95% |
| 1/20 | OVER 99% |
| 1/50 | OVER 99% |

TREATMENT APPARATUS AND TREATMENT METHOD FOR ORGANIC WASTE

CROSS-REFERENCE TO RELATED APPLICATIONS

This application is based upon and claims the benefit of priority from the prior Japanese Patent Application No. 2003-295480, filed on Aug. 19, 2003; the entire contents of which are incorporated herein by reference.

BACKGROUND OF THE INVENTION

1. Field of the Invention

The present invention relates to a treatment apparatus and a treatment method for organic waste for safely and continuously decomposing organic waste containing polybiphenyl chloride (PCB), polyvinyl chloride, or radioactive substances etc.

2. Description of the Background

In recent years, in relation to the earth environmental problems, treatment of organic waste including harmful substances such as polybiphenyl chloride (PCB), decomposition retardant substances such as fron gas, resin such as polyvinyl chloride, or radioactive substances is a big problem. Generally, organic waste is treated by the incineration. However, by this incineration treatment method, many problems arise that poisonous substances such as dioxine and nitrogen oxide are generated and a large scale apparatus is required to collect those poisonous substances.

In recent years, as a method for decomposing organic substances, a method of using water (supercritical water) at a high temperature and a high pressure exceeding the critical point of water (temperature: 374° C., pressure: 22.1 MPa) has been noticed. The supercritical state means a state of a substance at a temperature and pressure exceeding the critical temperature and the critical pressure which are physical amounts intrinsic to an individual compound. A substance in this state is referred to as a supercritical fluid.

For example, a method of mixing an organic substance, water, and a fluid containing oxygen and oxidatively destructing the organic substance in the supercritical state exceeding the critical point of water is known, as discussed in Japanese Patent Publication No. Hei 1-38532 which is hereby incorporated by reference The supercritical water has an internal property between a liquid and a gas and is optionally mixed with an organic substance and oxygen, and thereby it is possible to oxidatively decompose an organic substance efficiently in a short time.

As the structure of a reaction vessel for realizing these reactions, there is a vessel type reaction vessel available, as discussed in Japanese Patent No. 2726293 which is hereby incorporated by reference. The vessel type reaction vessel has a structure that the upper part of the reaction vessel is used under the supercritical condition, and the lower part thereof is used under the liquid condition. Organic waste and oxygen are introduced from the upper part of the reaction vessel, and carbon dioxide obtained by decomposition of an organic substance is ejected from the upper part of the reaction vessel, and an inorganic substance is ejected from the lower part. This reaction vessel has an advantage that an inorganic substance having low solubility in supercritical water can be collected into a liquid on the lower part.

As for the upper part of the vessel type reaction vessel, to maintain the supercritical water condition, it is required to preheat waste and an oxidizer. Therefore, an introduction hole for introducing waste and an oxidizer at high temperature and high pressure into a reaction vessel at high temperature and high pressure is necessary. The introduction hole has a structure of being welded to or screwed into the reaction vessel. So that when a phenomenon that the temperature of waste is suddenly lowered is generated, a temperature difference is caused between the reaction vessel and the waste introduction hole. As a result, a difference in extension is caused between them, and a gap is generated between them, causing a leak. Therefore, the reaction vessel desirably has a structure and a constitution causing no temperature difference as much as possible.

Further, as an apparatus for treating corrosive substances, various reaction vessels having an anti-corrosive inner vessel installed in a pressure vessel have been proposed. For example, in Japanese Patent Disclosure No. Hei 9-85075, which is hereby incorporated by reference, inside the vessel type reaction vessel mentioned above, an anti-corrosive vessel is arranged and the inside and outside of the anti-corrosive vessel are controlled to the practically same pressure using high-pressure air. When high-pressure air is used, if a pin hole is formed in the pressure vessel during operation, air fed to maintain the same pressure is ejected outside the system. When air is opened from high pressure to low pressure, a very large volume expansion is caused, thus there is a great latent danger compared with a case where a liquid is used.

From the aforementioned, development of a safer treatment apparatus is desired for decomposing and reacting perfectly organic waste to a substance as a target

SUMMARY OF THE INVENTION

An object of the present invention is to provide a treatment apparatus and a treatment method for organic waste which can decompose safely and continuously organic waste containing polybiphenyl chloride, polyvinyl chloride, or radioactive substances etc.

According to an aspect of this invention, there is provided a treatment apparatus for organic waste including a reaction vessel for introducing and decomposing organic waste and pulling out decomposed organic waste as a treated fluid. The reaction vessel includes an internal vessel made of corrosion-resistant material, an external vessel made of pressure-resistant material provided for surrounding the internal vessel via a gap, and an interconnection pipe for interconnecting the gap and the internal vessel outside the external vessel, thereby to control inside the gap and inside the internal vessel to practically equal pressure. The internal vessel has a heating zone for heating the introduced organic waste to a temperature higher than a critical point of water, a reaction zone for holding and decomposing the organic waste at a temperature higher than the critical point of water, and a cooling zone for cooling the treated fluid containing a decomposition product of the organic waste to lower than 100° C. The gap is adapted to be charged with high-pressure water or hydrogen peroxide water.

According to another aspect of this invention, there is provided the treatment apparatus for organic waste as described above further including a tank for keeping the organic waste, a pump for introducing the organic waste into the reaction vessel, a tank for storing the hydrogen peroxide water, a pump for introducing the hydrogen peroxide water into the reaction vessel, a back pressure regulator for reducing pressure of the treated fluid, a gas-liquid separator for separating the treated fluid into decomposed gas and decomposed liquid, a tank for collecting the decomposed liquid, and a hood or a box inside of which is controlled to a negative pressure. Here, the reaction vessel, the tank for storing the organic waste, the pump for introducing the organic waste into the reaction vessel, the back pressure regulator for reducing pressure of the treated fluid, the gas-liquid separator for separating the treated fluid into decomposed gas and decomposed liquid, and the tank for collecting the decomposed liquid are installed in the hood or the box.

According to still another aspect of this invention, there is provided a treatment method for organic waste including the steps of introducing a waste liquid generated from a liquid scintillation counter used to analyze a radioactive element as the organic waste into the treatment apparatus of organic waste as described above, and treating the organic waste by the treatment apparatus for organic waste as described above.

According to the present invention, it is possible to provide a treatment apparatus and a treatment method for organic waste for safely and continuously decomposing organic waste containing polybiphenyl chloride, polyvinyl chloride, or radioactive substances etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table showing experimental data for verifying the effects of the first embodiment of the present invention;

FIG. 4 is graphs showing experimental data for verifying the effects of the second embodiment of the present invention;

FIG. 11 is a table showing experimental data for verifying the effects of the sixth embodiment of the present invention;

FIG. 12 is a cross sectional view showing a reaction vessel of a treatment apparatus for organic waste according to a seventh embodiment of the present invention;

FIG. 13 is a cross sectional view showing a reaction vessel of a treatment apparatus for organic waste according to a modification of the seventh embodiment of the present invention;

DETAILED DESCRIPTION OF THE INVENTION

Figure 1:
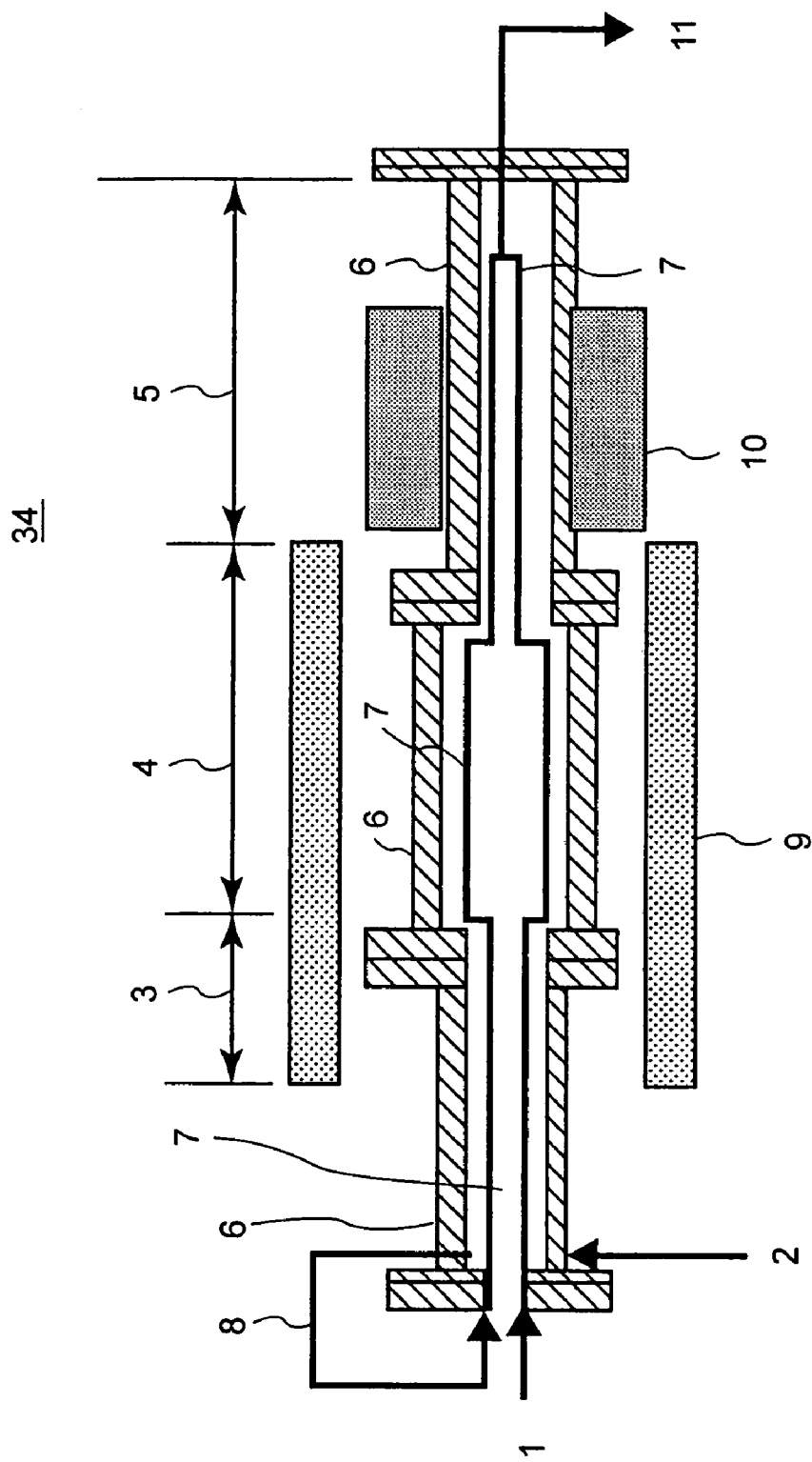
FIG. 1 is a cross sectional view showing a reaction vessel of a treatment apparatus for organic waste according to a first embodiment of the present invention.

Referring now to the drawings, wherein like reference numerals designate identical or corresponding parts throughout the several views, the detailed explanation thereof will be omitted. Hereinafter with reference to the drawings, the embodiments 1 to 11 of this invention will be described below.

Embodiment 1

The first embodiment of the present invention will be explained by referring to FIGS. 1, 2 and 3.

FIG. 1 shows a cross sectional view of a reaction vessel 34 installed in a treatment apparatus for organic waste according to this embodiment. Namely, in the treatment apparatus for continuously feeding and continuously pulling out a fluid to be treated including waste 1 and water or hydrogen peroxide water 2 to and from the reaction vessel 34 held in an atmosphere above the critical point of water, the reaction vessel 34 is a double vessel composed of an external vessel 6 and an internal vessel 7. The internal vessel 7 and the external vessel 6 are interconnected via an interconnection pipe 8 installed outside the external vessel 6, and thereby the internal pressure of the internal vessel 7 is practically equal to the internal pressure of the external vessel 6.

In FIG. 1, waste 1 is fed to the internal vessel 7 of the reaction vessel 34, and water or hydrogen peroxide water 2 is fed in a gap between the internal vessel 7 and the external vessel 6 of the reaction vessel 34.

Figure 5:
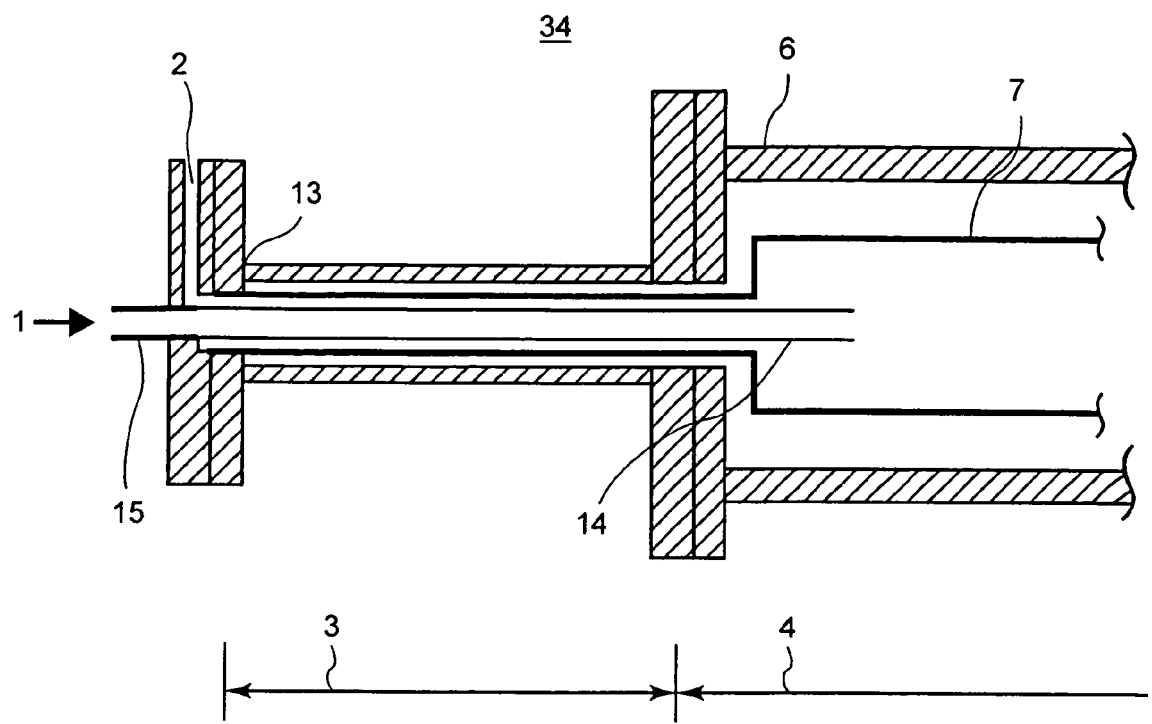
FIG. 5 is a cross sectional view showing an entrance of a reaction vessel of a treatment apparatus for organic waste according to a third embodiment of the present invention.

Here, FIG. 1 shows the reaction vessel 34 only schematically, so that the gap is not shown in FIG. 1. As for the gap, it is requested to refer to FIG. 5 described later. In FIG. 5, the gap between the internal vessel 7 and the external vessel 6 of the reaction vessel 34 is shown clearly.

The internal vessel 7 has three zones such as a heating zone 3 for heating a fluid in the internal vessel 7 to a temperature higher than the critical point of water, a reaction zone 4 for holding the fluid in the internal vessel 7 at a temperature higher than the critical point of water, and a cooling zone 5 for cooling the temperature in the internal vessel 7 to lower than 100° C. Outside the external vessel 6, a heater 9 and a cooler 10 are installed. Via the water or the hydrogen peroxide water 2 fed in the gap between the internal vessel 7 and the external vessel 6, the heater 9 heats the heating zone 3 and the reaction zone 4 of the internal vessel 7, and the cooler 10 cools the cooling zone 5 of the internal vessel 7.

The fluid to be treated fed in the internal vessel 7 is heated in the heating zone of the internal vessel 7 and is reacted in the reaction zone 4 of the internal vessel 7, is cooled to a temperature lower than 100° C. in the cooling zone 5 of the internal vessel 7, and then is ejected from the reaction vessel 34 as a treated fluid 11. The water or the hydrogen peroxide water 2 pulled out from the external vessel 6 is fed to internal vessel The internal vessel 7 can be exchanged depending on the treatment conditions of organic waste to be treated. As for the internal vessel 7 a non-pressure vessel is used, the internal vessel 7 can be made thinner, and thus an inexpensive treatment apparatus can be provided.

Water or the hydrogen peroxide water 2 is higher in temperature than the critical point of water in the neighborhood of the reaction zone 4 in the internal vessel 7.

Furthermore, water or the hydrogen peroxide water 2 to be introduced into the reaction vessel 34 is introduced via a path from the outside of the external vessel 6 to the inside, from the inside of the external vessel 6 to the outside, and from the outside of the external vessel 6 into the internal vessel 7, thereby to maintain inside the external vessel 6 and inside the internal vessel 7 at uniform pressure.

Figure 2:
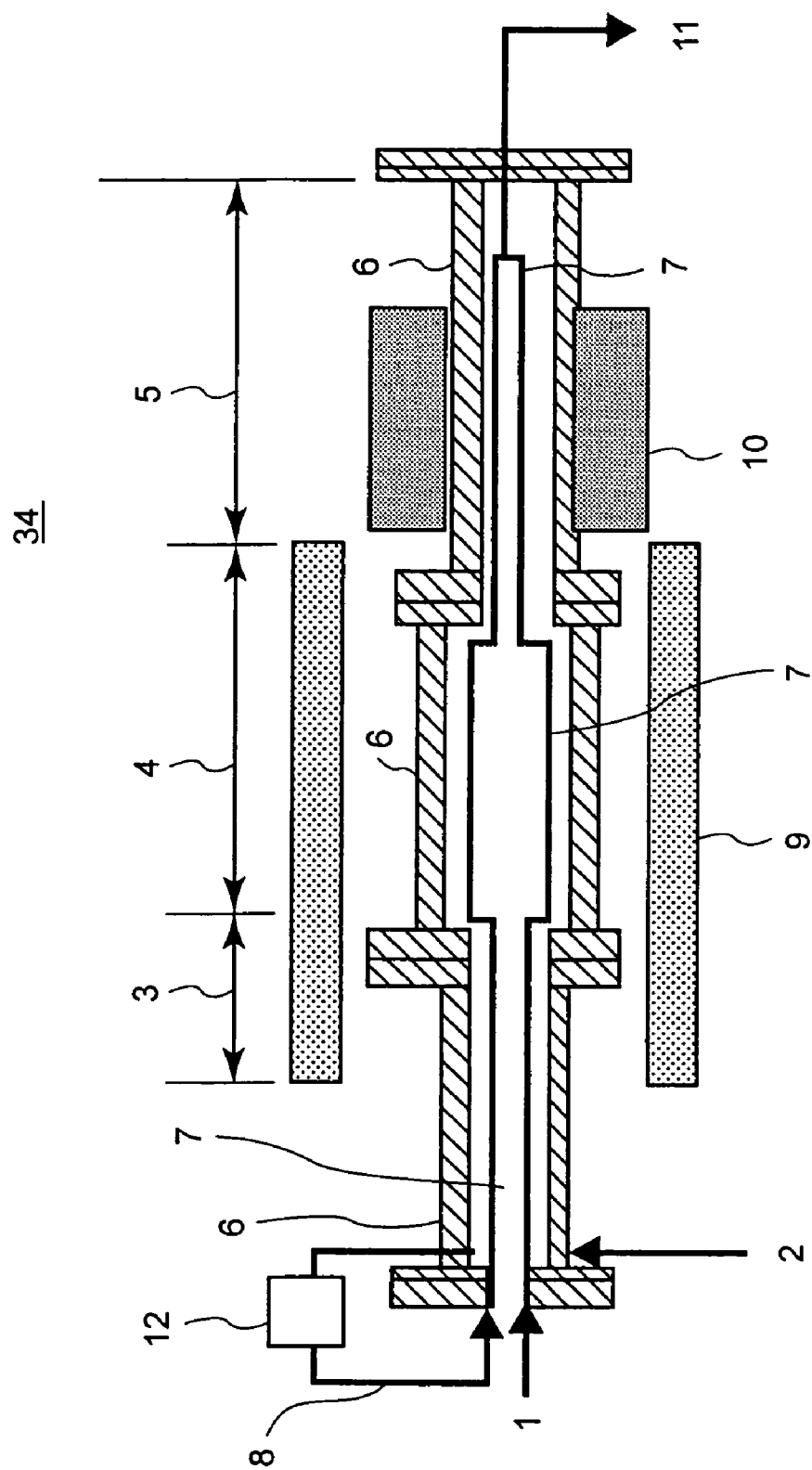
FIG. 2 is a cross sectional view showing a reaction vessel of a treatment apparatus for organic waste according to a modification of the first embodiment of the present invention.

FIG. 2 shows a modified example of the first embodiment of this invention shown in FIG. 1. In FIG. 2, a heat exchanger 12 is installed in the interconnection pipe 8 of the reaction vessel 34. Even if the water or the hydrogen peroxide water 2 pulled out from the external vessel 6 is heated to a high temperature in the reaction vessel 34, it is cooled by the heat exchanger 12. Thus when the water or the hydrogen peroxide water 2 is introduced again into the reaction vessel 34, the temperature thereof can be surely adjusted to lower than 100° C.

Next, the safety in a case that it is assumed that a pin hole is formed in the external vessel 6 and an internal fluid leaks outside will be verified. The volume of the external vessel 6 is assumed as 500 ml and the volume of the gap between the internal vessel 7 and the external vessel 6 is assumed as 50 ml. The reaction vessel 34 is assumed to be installed in a glove box of 1 meter square.

For the verification, two cases (1) and (2) are assumed. In the gap between the external vessel 6 and the internal vessel 7, a case (1) is that air at 450° C. and 30 MPa is charged and a case (2) (according to the embodiment of this invention) is that water is charged. In the table shown in FIG. 3, the results when the whole quantity of air at 450° C. (the case (1)) or water (the case (2)) leaks instantaneously into the glove box from the external vessel 6 and is cooled to 50° C. by the air in the glove box are indicated. In the constitution that air is charged as in the case (1), the volume is 6700 ml and the pressure in the glove box is 600 Pa ($6.1 \times 10^{-3}$ atmospheric pressure). On the other hand, in the constitution that water is charged as in the case (2), the volume is 7.4 ml and the pressure in the glove box is 0.73 Pa ($7.4 \times 10^{-6}$ atmospheric pressure). When air is used as in the case (1), the inner pressure of the glove box may be increased, while as in the case (2), that is, in this embodiment using water, an increase in the inner pressure can be almost ignored.

In this embodiment, the reaction vessel 34 is divided into three zones of the heating zone 3, the reaction zone 4, and the cooling zone 5, and the waste 1 is introduced in the reaction vessel 34 and the treated fluid 11 is pulled out from the reaction vessel 34 under the temperature condition of lower than 100° C. So that no temperature difference is generated between the reaction vessel 34 and the waste introduction hole, and no extension difference is generated, thus the factor for leak can be greatly reduced. Further, to realize the same pressure in the internal vessel 7 and in the external vessel 6, a liquid is filled inside the reaction vessel 34, instead of air. So that even when a pin hole is generated in the external vessel 6 and a leak is caused, compared with a case that air is used, the volume expansion is smaller and the reaction vessel is safer. Therefore, the treatment apparatus for organic waste according to this embodiment can treat organic waste safely.

Embodiment 2

Next, a treatment apparatus for organic waste according to a second embodiment of this invention will be explained. In the reaction vessel 34 shown in FIG. 1 or 2, when the internal vessel 7 is made of titanium, tantalum, or titanium palladium, organic waste which generates a corrosive acid such as sulfuric acid by decomposition can be treated.

FIG. 4 shows measured results of the corrosion rate of titanium (Ti), tantalum (Ta), and titanium palladium (Ti—Pd) along with stainless steel 316L, Inconel 625, and Hastelloy C-276 for comparison. Test specimens are dipped in a case (a) 2% hydrogen peroxide water +2% sulfuric acid or in a case (b) 2% hydrogen peroxide water +2% hydrochloric acid for five hours, and weight change amounts are measured. The temperature and pressure conditions are 400° C. and 28.5 MPa in two cases (a) and (b). The test results show that stainless steel 316L, Inconel 625, and Hastelloy C-276 greatly reduce in weight and corrode remarkably. While titanium (Ti), tantalum (Ta), and titanium palladium (Ti—Pd) generate a stubborn oxide layer on each surface, increase in weight, and hardly corrode.

The temperature when titanium is used for the internal vessel 7 is desirably lower than 500° C. Titanium, when its temperature exceeds 500° C., creeps and the soundness of the internal vessel 7 comes into a problem. Therefore, when a titanium vessel is to be used, the temperature of the internal vessel 7 must be reduced to lower than 500° C. Further, for the external vessel 6, when a material which is intensive at high temperature such as low-carbon steel, stainless steel, or a nickel alloy is used, the internal vessel 7 can be made thinner, thus a reaction vessel 34 which is low-priced and space-saved can be realized.

From the aforementioned, when a highly corrosion-resistant material such as titanium, tantalum, or titanium palladium is used as a material of the internal vessel 7 as in this embodiment, organic waste which generates an acid by decomposition can be treated. Further, the corrosiveness of the internal vessel 7 can be reduced, so that the exchange frequency of the internal vessel 7 can be reduced. Furthermore, when a material intensive at high temperature such as low-carbon steel, stainless steel, or a nickel alloy is used as a material of the external vessel 6, a reaction vessel 34 which is low-priced and space-saved can be realized.

Further, in these embodiment, if the internal vessel 7 and the external vessel 6 are structured so as to be easily removed by the heating zone 3, the reaction zone 4, and the cooling zone 5, when exchanging partially the internal vessel 7 and the external vessel 6, there is no need to exchange the whole and the cost of maintenance and repair of the treatment apparatus for organic waste can be reduced.

Embodiment 3

Next, a treatment apparatus for organic waste according to a third embodiment of the present invention will be explained by referring to FIGS. 5, 6, and 7. FIG. 5 is a cross sectional view of the entrance of the reaction vessel 34 according to this embodiment. The entrance of the reaction vessel 34 is structured so as to fix the internal vessel 7 to the external vessel 6. With a fixed part 13 as a start point, the internal vessel 7 can freely move right and left in correspondence with up and down of the temperature. For a feed pipe 14 of the waste 1, at the entrance of the reaction vessel 34, a pipe 15 (for example, stainless steel) intensive at high temperature is used and in the internal vessel 7, a corrosion-resistant pipe (for example, titanium) is used.

The waste 1 is introduced from the feed pipe 14 into the internal vessel 7, then is heated in the heating zone 3, and reacts to water or the hydrogen peroxide water 2 in the reaction zone 4. On the other hand, water or the hydrogen peroxide water 2 is introduced into the internal vessel 7 via a different line from the line for the waste 1, is heated in the heating zone 3, and reacts to the waste 1 in the reaction zone 4.

As mentioned above, the waste 1 and water or the hydrogen peroxide water 2 are separately introduced into the internal vessel 7. The reason is that otherwise, the waste 1 and water react to each other and generate heat, thus the entrance of the reaction vessel 34 is damaged. However, when it is found beforehand that even if the waste 1 and water or the hydrogen peroxide water 2 are mixed, they will not generate heat suddenly, they may be introduced from the same introduction entrance or in the mixture state.

Figure 6:
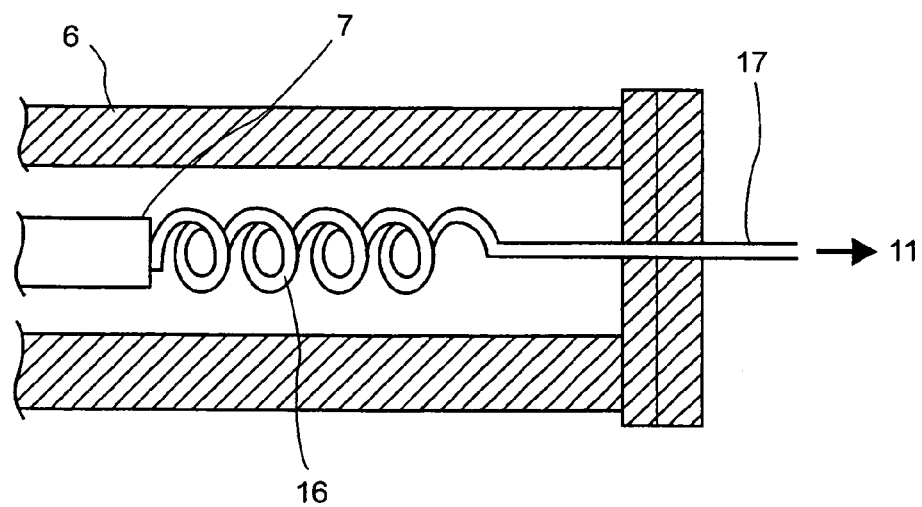
FIG. 6 is a cross sectional view showing an exit of a reaction vessel of a treatment apparatus for organic waste according to a third embodiment of the present invention.
Figure 7:
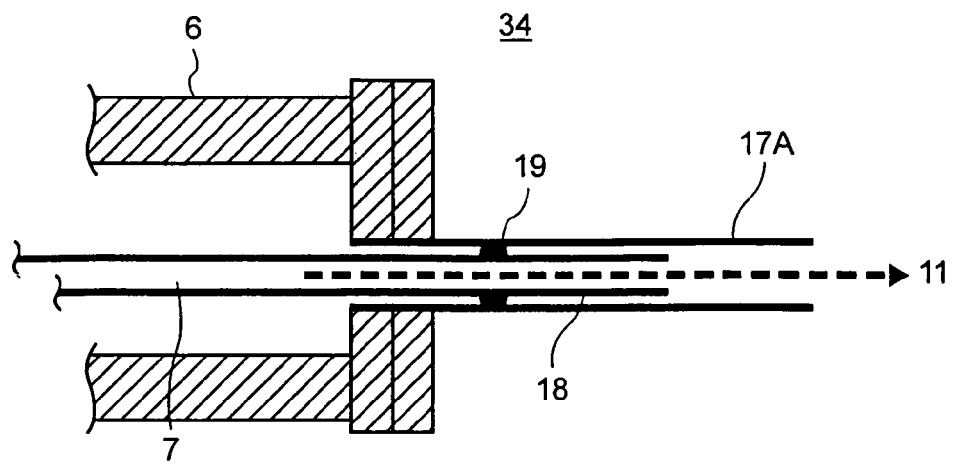
FIG. 7 is a cross sectional view showing another example of an exit of a reaction vessel of a treatment apparatus for organic waste according to a third embodiment of the present invention.

FIGS. 6 and 7 show cross sectional views of the exits of the reaction vessels 34. The exit of the reaction vessel 34 is structured so as to absorb a difference in the thermal extension between the external vessel 6 and the internal vessel 7. In FIG. 6, the internal vessel 7 is fixed to the external vessel 6, but the exit of the internal vessel 7 is composed of a spiral pipe 16 and is structured so as to absorb a thermal extension by the expansion and contraction of the spiral pipe 16. The treated fluid 11 is ejected from a pull-out pipe 17 intensive at high temperature outside the external vessel 6 via the spiral pipe 16.

The example shown in FIG. 7 has a structure that the internal vessel 7 is not fixed to the external vessel 6 and the internal vessel 7 smoothly moves to absorb a thermal extension. A pull-out pipe 18 constituting the exit of the internal vessel 7 which is highly corrosion-resistant and not intensive at high temperature passes through the flange of the external vessel 6, and a pull-out pipe 17A intensive at high temperature is fixed to the flange of the external vessel 6.

The pressure of the external vessel 6 is sealed by an O-ring 19 made of rubber installed between the pull-out pipe 18 not intensive at high temperature and the pull-out pipe 17 intensive at high temperature. Therefore, water charged in the space between the external vessel 6 and the internal vessel 7 is charged up to this side of the O-ring 19. The external vessel 6 and the internal vessel 7 are composed of different kinds of materials, so that they are different in the coefficient of linear expansion, and in the course of temperature rise, a difference in the extension between them is generated. The extension difference is absorbed by horizontal movement of the pull-out pipe 18 not intensive at high temperature. For example, when stainless steel is used for the external vessel 6 and titanium is used for the internal vessel 7, the coefficients of linear expansion are respectively $16.5 \times 10^{-6}$ cm/cm/° C. and $8.4 \times 10^{-6}$ cm/cm/° C. When the temperature rises by 100° C., the vessels extend respectively by 16.5 µm/cm and 8.4 µm/cm. For example, when the pipe is 1 m in length, the extensions are respectively 1.65 mm and 0.84 mm, and the difference between the external vessel 6 and the internal vessel 7 is 0.81 mm. When the extension difference is applied to the structure shown in FIG. 7, it can be absorbed if the internal vessel 7 moves left by 0.81 mm to the external vessel 6. This movement is realized in the state that the liquid-tightness is held by the O-ring 19.

On the other hand, when a high-temperature treated fluid 11 passes through the pull-out pipe 18 not intensive at high temperature from the external vessel 6 in a case of a trouble such as suspension of cooling water supply, the pull-out pipe 18 not intensive at high temperature and the O-ring 19 are destroyed. However, the pressure resistance is guaranteed by the pull-out pipe 17A intensive at high temperature, so that the treatment apparatus for organic waste can be stopped safely.

As mentioned above, this embodiment has a structure that the internal vessel 7 is fixed to one end of the external vessel 6 and the other end absorbs an extension difference due to heat between the internal vessel 7 and the external vessel 6. So that when the temperature rises and falls, the internal vessel 7 is not pulled and compressed by the external vessel 6 due to a difference in the expansion and contraction, and the soundness of the internal vessel 7 can be held.

Embodiment 4

Next, a treatment apparatus for organic waste according to a fourth embodiment of this invention will be explained. In the aforementioned structure shown in FIGS. 1, 2, and 5, the internal vessel 7 may use a cylindrical reaction vessel, and the section of the reaction zone 4 of the internal vessel 7 may have a constitution that a plurality of cylinders different in the inner diameter are concentrically combined or a constitution that rectifier plates are alternately installed in the longitudinal direction of the cylindrical reaction vessel. In this embodiment, the flow of the fluid in the reaction zone 4 can be changed to a plug flow, and waste can be treated stably.

Supercritical water can easily decompose a decomposition retardant substance, though acetic acid and alcohol are slow in the decomposition rate. To perfectly decompose acetic acid and alcohol, it is necessary to react them for long hours. However, supercritical water has a large diffusion coefficient and can be easily mixed in the flow direction. To form a reaction field hardly mixed in the flow direction, generally, there is a method using a tube type reaction vessel available. However, when a tube type reaction vessel is manufactured as a double vessel, the vessel is very long in length, thus a wide space is required. Further, when the reaction vessel is long in length, the thermal extension is increased, thus a problem arises that a constitution of absorbing an extension difference is difficult. Therefore, when a structure is formed that a vessel type reaction vessel having a large inner diameter compared with the tube type reaction vessel is installed, and concentric partitions are installed in the internal vessel, and supercritical water is hardly mixed in the flow direction, waste is decomposed stably.

As mentioned above, this embodiment realizes a compact reaction vessel by use of a structure that partitions are installed in the internal vessel 7 in the longitudinal direction, and the flow rate of a vessel type reaction vessel with a large inner diameter is made equal to the flow rate of a tube type reaction vessel, and supercritical water is hardly mixed in the flow direction.

Embodiment 5

Figure 8:
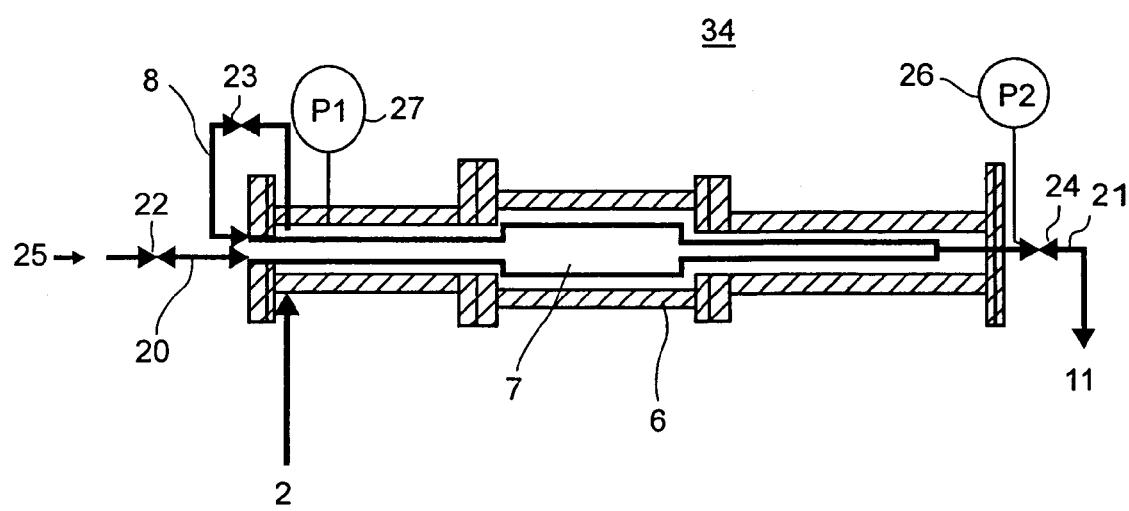
FIG. 8 is a cross sectional view showing a reaction vessel of a treatment apparatus for organic waste according to a fifth embodiment of the present invention.

Next, a treatment apparatus for organic waste according to a fifth embodiment of the present invention will be explained by referring to FIGS. 8 and 9. FIG. 8 shows a constitution for confirming the existence of leakage of the internal vessel 7. Namely, at three positions such as a line 20 for introducing the waste 1 into the reaction vessel 34, the interconnection pipe 8 for interconnecting inside the external vessel 6 and inside the internal vessel 7 such that they are practically to the same pressure, and a line 21 for pulling out the treated fluid 11, valves 22, 23, and 24 are installed.

By use of such a constitution, firstly, the valve 23 installed on the interconnection pipe 8 is opened, and inside the external vessel 6 and inside the internal vessel 7 are controlled to the same pressure. Then the valve 23 installed on the interconnection pipe 8 is closed, and the valve 22 of the line 20 for introducing waste 1 is opened, and water 25 is introduced into the internal vessel 7. In the state that the valve 24 installed on the line 21 for pulling out treated fluid 11 is closed, the water 25 is continuously introduced so that an instruction value $P_2$ of a pressure gauge 26 for measuring an inner pressure of the internal vessel 7 becomes higher than an instruction value $P_1$ of a pressure gauge 27 for measuring a pressure of the gap between the external vessel 6 and the internal vessel 7. In this state, the valve 22 of the line 20 is closed. The inner pressure of the internal vessel 7 reduces with the elapse of time, and if the instruction values $P_2$ and $P_1$ of the pressure gauges 26 and 27 become almost the same pressure, it is judged that the internal vessel 7 leaks from a pin hole.

On the other hand, when the inner pressure of the internal vessel 7 does not vary with the elapse of time, and the instruction value $P_2$ of the pressure gauge 26 is sufficiently high compared with the instruction value $P_1$ of the pressure gauge 27, it is judged that the internal vessel 7 is free of leakage due to a pin hole and it is sound. The difference in the instruction values $P_2$ and $P_1$ between the pressure gauges 26 and 27 may be set to a predetermined pressure value permitted by the internal vessel 7. Generally it is sufficiently set to about 0.2 MPa. When the internal soundness is confirmed, the valves 22, 23, and 24 are opened, and inside the internal vessel 7 and inside the external vessel 6 are all set to the same pressure, and the treatment apparatus for organic waste is restarted.

Figure 9:
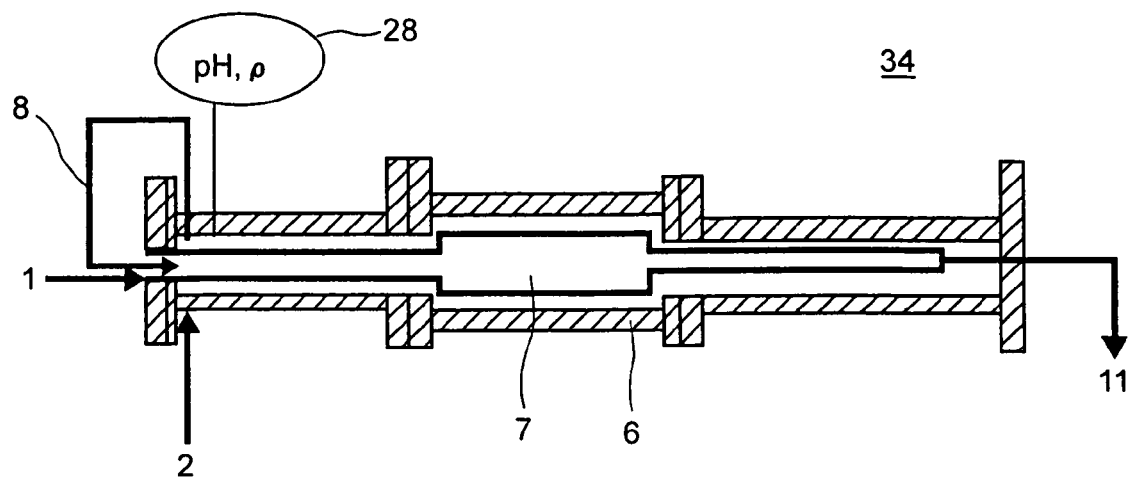
FIG. 9 is a cross sectional view showing a reaction vessel of a treatment apparatus for organic waste according to a modification of the fifth embodiment of the present invention.

FIG. 9 shows a constitution for measuring the hydrogen ion concentration and the conductivity of the water charged in the gap between the external vessel 6 and the internal vessel 7 and for measuring the soundness of the internal vessel 7 in real time. The waste 1 is introduced into the internal vessel 7, and is decomposed to generate carbon dioxide. Further, depending on the kind of waste 1, an acid may be generated. Water charged in the gap between the external vessel 6 and the internal vessel 7 generally contains little ion component. Therefore, when a pin hole or a crack is formed on the internal vessel 7 and the substance in the internal vessel 7 leaks into the gap between the internal vessel 7 and the external vessel 6, the hydrogen ion concentration and the conductivity of the water charged in the gap are suddenly increased and by measuring them, the existence of leakage can be judged. A hydrogen ion concentration and conductivity gauge 28 for monitoring the leakage is preferably installed at the entrance and exit of the external vessel 6 or on the interconnection pipe 8. In this case, it is desirably used in the temperature area lower than 100° C.

As mentioned above, according to this embodiment, the internal soundness of the reaction vessel 34 is confirmed in real time or periodically at the start time of the treatment apparatus, thus leakage of the internal vessel 7 can be confirmed, and the reaction vessel 34 can be exchanged at a proper time, and the treatment apparatus for organic waste can be operated safely.

Embodiment 6

Figure 10:
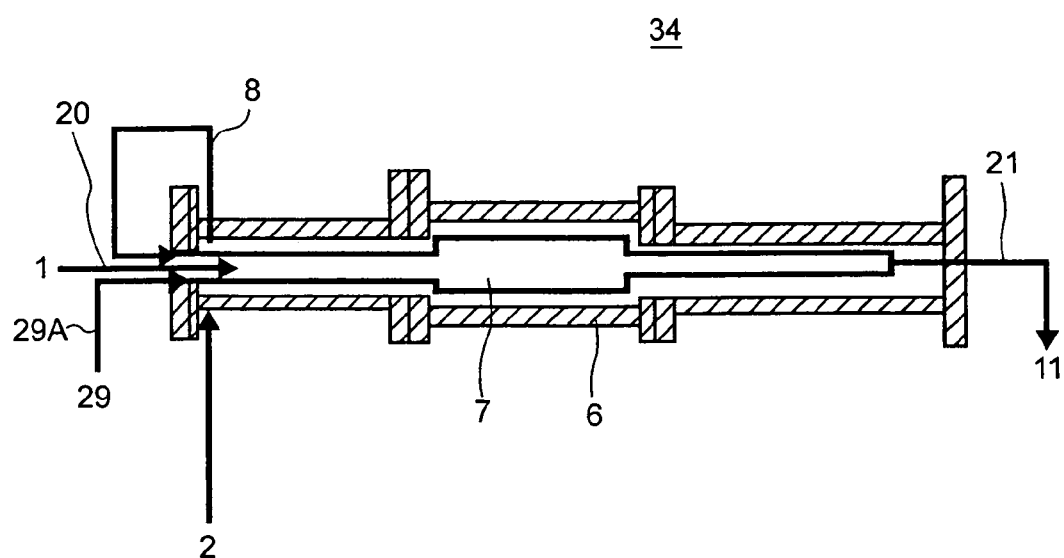
FIG. 10 is a cross sectional view showing a reaction vessel of a treatment apparatus for organic waste according to a sixth embodiment of the present invention.

Next, a treatment apparatus for organic waste according to a sixth embodiment of the present invention will be explained. This embodiment has a constitution that, as shown in FIG. 10, in the reaction vessel 34, in addition to the line 20 for introducing the waste 1, the line 21 for pulling out the treated fluid 11, and the interconnection pipe 8, a line 29A for introducing a fluid 29 containing an oxidizing agent such as air, oxygen, or ozone is installed.

The table in FIG. 11 shows a comparison of the waste liquid generation amount when benzene is decomposed using air or 30% hydrogen peroxide water. Air or hydrogen peroxide water 1.5 times a stoichiometry value when benzene is decomposed to carbon dioxide and water is added. When hydrogen peroxide water is used, the waste liquid generation amount is 29 times, while when air is used, the waste liquid generation amount is 0.7 times. Thus when air is used, the waste liquid generation amount is reduced greatly.

From the aforementioned, by addition of the fluid 29 containing an oxidizing agent such as air, this embodiment can greatly reduce the generation amount of the treated fluid 11.

Embodiment 7

Next, a treatment apparatus for organic waste according to a seventh embodiment of the present invention will be explained by referring to FIGS. 12 and 13.

Assuming that the reaction vessel 34 is installed horizontally, the extension of the external vessel 6 increases as the temperature rises. Therefore, when both ends of the external vessel 6 are fixed, the extension of the external vessel 6 cannot be absorbed, causing damage. Therefore, in this embodiment, as shown in FIG. 12, a structure is used that a reaction vessel 34 having a frame 30 to which a vessel fixing part 31 and a vessel fixing part 32 with a pulley attached are attached is installed. The extension of the reaction vessel 34 is allowed by the movement of the vessel fixing part 32 with a pulley attached on a pulley rail 33.

Further, when the reaction vessel 34 is to be inclined and installed so as to easily eject inner gas of the reaction vessel 34 and set an exit 34a of the reaction vessel 34 higher in height than an entrance 34b of the reaction vessel 34, the frame 30 and the pulley rail 33 are installed as shown in FIG. 13, thus the extension of the reaction vessel 34 can be absorbed.

From the aforementioned, according to this embodiment, a pulley is installed on the reaction vessel 34, and the reaction vessel 34 is installed on the frame 30. Thus the thermal extension of the reaction vessel 34 is allowed, the reaction vessel 34 is not damaged, and a stable waste treatment can be performed.

Embodiment 8

Figures 14, 15:
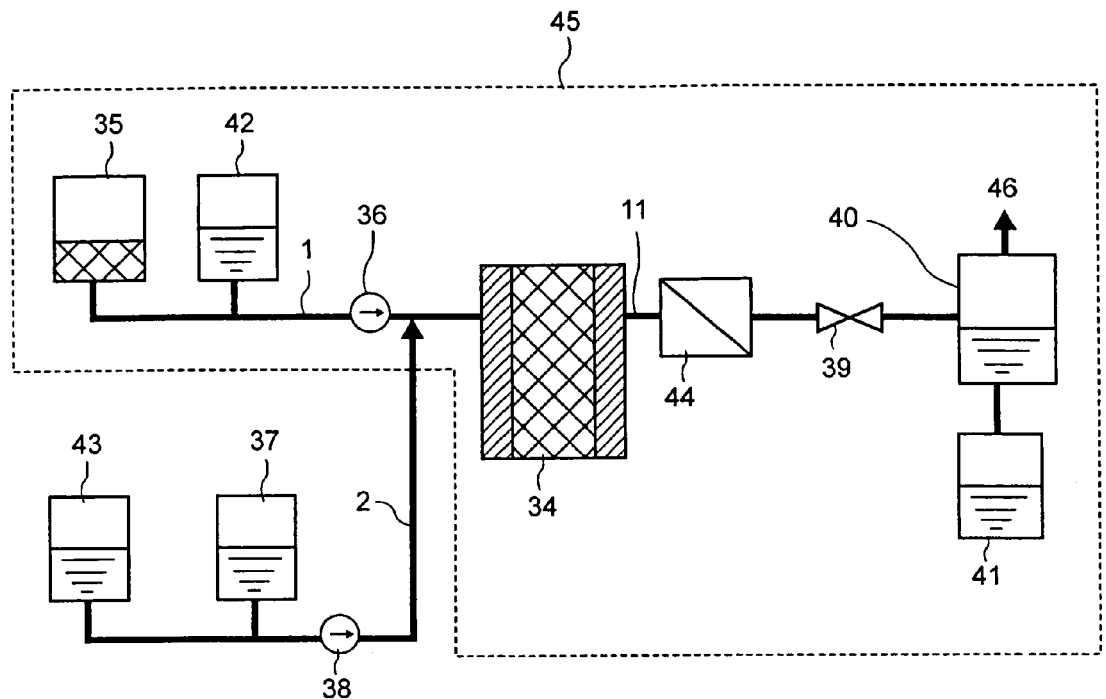
FIG. 14 is a block diagram showing a treatment apparatus for organic waste according to an eighth embodiment of the present invention.
FIG. 15 is a table showing experimental data for verifying the effects of a tenth embodiment of the present invention.

Next, a treatment apparatus for organic waste according to an eighth embodiment of the present invention will be explained. As shown in FIG. 14, the treatment apparatus for organic waste of this embodiment is provided with the reaction vessel 34, a waste tank 35 for storing the waste 1 to be treated, a high-pressure pump 36 for introducing the waste 1 into the reaction vessel 34, a hydrogen peroxide water tank 37 for storing hydrogen peroxide water, a high-pressure pump 38 for introducing the hydrogen peroxide water into the reaction vessel 34, a back pressure regulator 39 for reducing the pressure of the treated fluid 11, a gas-liquid separator 40 for separating the treated fluid 11 into decomposed gas 46 and decomposed liquid, and a decomposed liquid tank 41 for collecting the decomposed liquid.

Furthermore, at the preceding stage of the high-pressure pump 36 for introducing waste 1, a water tank 42 is installed, and at the preceding stage of the high-pressure pump 38 for introducing hydrogen peroxide water, a water tank 43 is installed. Moreover, in the flow path of the treated fluid 11, a filter 44 for protecting the back pressure regulator 39 is installed.

When leakage of organic waste outside the system comes into a problem like radioactive waste, a unit which may be contaminated by radioactive waste is desirably installed in a box the pressure in which is controlled at a negative pressure. Accordingly, in this embodiment, the units other than the hydrogen peroxide water tank 37 for storing hydrogen peroxide water, the water tank 43, and the high-pressure pump 38 for introducing hydrogen peroxide water into the reaction vessel 34 are installed in a box 45 the pressure in which is controlled at a negative pressure. The box 45 controlled at a negative pressure can use a hood instead of a glove box.

From the aforementioned, in this embodiment, when treating organic waste whose leakage outside the system comes into a problem, units having chances for leakage are installed inside the box 45 the pressure in which is controlled at a negative pressure, thus a safe waste treatment can be performed.

Embodiment 9

Next a treatment method for organic waste according to a ninth embodiment of this invention will be explained.

In this embodiment, the waste 1 is a waste liquid generated from a liquid scintillation counter used to analyze a radioactive element. When a small treatment apparatus in which the capacity of the reaction vessel 34 is less than 1 litter is used, it is a compact treatment apparatus which can be installed in an existing Oak Ridge type hood or California type hood.

These hoods have only a space of 2 m (width)×1 m (depth)×1 m (height). Particularly when the reaction vessel 34 occupying a widest space is to be formed about 1.5 m in length, the inner diameter thereof must be 4.6 cm. The thickness of a high-temperature and high-pressure vessel is proportional to the inner diameter thereof, so that the inner diameter is desirably as small as possible. Therefore, in consideration of a range which can be realistically manufactured, when the capacity of the reaction vessel 34 is to be less than 1 litter, a compact and inexpensive treatment apparatus for organic waste can be realized.

Embodiment 10

Next a treatment method for organic waste according to a tenth embodiment of this invention will be explained. In this embodiment, when sodium hydroxide is added to organic waste beforehand, organic substances can be decomposed at very high speed. In the table in FIG. 15, the results when hydrogen peroxide water is added to a liquid scintillation counter cocktail and they are reacted at 400° C. and 30 MPa for 30 minutes are shown. The added amount of sodium hydroxide is $\frac{1}{20}$ or $\frac{1}{50}$ of the weight of the liquid scintillation counter cocktail. When sodium hydroxide is not added, the decomposition rate of the cocktail is 95%, though when sodium hydroxide is added, the decomposition rate of more than 99% is obtained. From the aforementioned, when the sodium hydroxide is added as in this embodiment, organic waste can be decomposed at very high speed.

Further, in this embodiment, when a reducing agent such as ammonium or formic acid is added to the waste 1 beforehand, nitrate ions contained in an organic waste liquid generated from the liquid scintillation counter and nitrate ions generated by the decomposition of the cocktail can be reduced and converted to nitrogen gas. When this treatment is performed, nitrate ions are not converted to NOx gas but the whole amount can be collected in the water in the state of nitrate ions. Nitrate ions in the organic waste liquid can be treated by a post treatment apparatus for carrying out ion exchange, precipitation, and extraction. However, in this embodiment, when a reducing agent is added beforehand, nitrate ions can be converted to nitrogen gas.

Embodiment 11

Next a treatment method for organic waste according to an eleventh embodiment of this invention will be explained. Post treatment methods for the treated fluid 11 obtained by the reaction vessel 34 of the treatment apparatus for organic waste in the aforementioned embodiments are indicated below.

When the waste 1 contains a volatile radioactive element such as technetium or iodine, decomposed gas containing technetium or iodine can be collected by making contact with an alkaline solution so as to conform to the emission criterion value.

A small amount of residual organic components in the treated fluid 11 can be treated by decomposing by ozone, hydrogen peroxide, or ultraviolet rays without being introduced again into the reaction vessel 34.

By separating a radioactive nuclide in the treated fluid 11 by ion exchange, precipitation, or extraction, the radioactive element can be reduced in volume. Further, the treated fluid 11 may be thickened and reduced in volume.

Further, the finally ejected waste can be formed to a stable solidified body or can be emitted into the sea.

Obviously, numerous modifications and variations of the present invention are possible in light of the above teachings. It is therefore to be understood that within the scope of the appended claims, the invention may be practiced otherwise than as specifically described herein.

What is claimed is:

1. A treatment apparatus for organic waste, comprising:
   a reaction vessel for introducing and decomposing organic waste, said reaction vessel having an outlet end to remove decomposed organic waste as a treated fluid;
   said reaction vessel including;
      an internal vessel made of corrosion-resistant material;
      an external vessel made of pressure-resistant material provided for surrounding said internal vessel via a gap; and
      an interconnection pipe for interconnecting said gap and said internal vessel to transmit a pressure inside of said internal vessel and a pressure inside of said gap to each other, thereby to control inside of said gap and inside of said internal vessel to practically equal pressure;
   said internal vessel having a heating zone configured to heat said introduced organic waste to a temperature higher than a critical point of water, a reaction zone configured to hold and decompose said organic waste at a temperature higher than said critical point of water, and a cooling zone configured to cool said treated fluid containing a decomposition product of said organic waste; and said gap being adapted to be charged with high-pressure water or hydrogen peroxide water.

2. The treatment apparatus for organic waste according to claim 1, wherein:

said interconnection pipe is provided with a heat exchanger installed midway thereof.

3. The treatment apparatus for organic waste according to claim 1, wherein:

said internal vessel is made of titanium, tantalum, or titanium palladium; and said external vessel is made of low-carbon steel, stainless steel, or a nickel alloy.

4. The treatment apparatus for organic waste according to claim 1, wherein:

a temperature of said internal vessel in said reaction zone is above a temperature higher than said critical point of water up to 500° C.

5. The treatment apparatus for organic waste according to claim 1, wherein:

said internal vessel and said external vessel are provided to be easily removed on boundaries of said heating zone, said reaction zone, and said cooling zone.

6. The treatment apparatus for organic waste according to claim 1, wherein:

one end of said internal vessel is fixed to said external vessel and the other end of said internal vessel is connected to said external vessel by a structure to absorb an extension difference due to heat between said internal vessel and said external vessel.

7. The treatment apparatus for organic waste according to claim 1, further comprising:

a feed pipe for introducing said organic waste into said internal vessel;

one end of said feed pipe being fixed to said external vessel;

the other end of said feed pipe extending into said reaction zone of the internal vessel;

whereby said organic waste and said water or said hydrogen peroxide water are mixed and reacted in said reaction zone.

8. The treatment apparatus for organic waste according to claim 1, further comprising:

a pipe made of a material intensive at high temperature provided around a pipe for pulling out said treated fluid from said internal vessel, thus to form a double-pipe structure; and a sealer provided between said pipe for pulling out said treated fluid and said pipe made of said material intensive at high temperature;

wherein;

said pipe for pulling out said treated fluid from said internal vessel passes through said external vessel;

said pipe made of said material intensive at high temperature is fixed to said external vessel, thus forming a structure that said gap between said external vessel and said internal vessel and a space between said pipe made of said material intensive at high temperature and said pipe for pulling out said treated fluid are connected; and said high-pressure fluid in said gap between said external vessel and said internal vessel is sealed by said sealer.

9. The treatment apparatus for organic waste according to claim 1, wherein:

said reaction zone of said internal vessel is a cylindrical vessel composed of cylinders with different inner diameters or rectifier plates which are alternately installed in the longitudinal direction of said cylindrical vessel.

10. The treatment apparatus for organic waste according to claim 1, further comprising:

partition valves, each provided respectively in one of a line for introducing said organic waste into said reaction vessel, a line for pulling out said treated fluid treated by said reaction vessel, and said interconnection pipe for controlling inside said external vessel and inside said internal vessel to practically equal pressure, thereby to control that said pressure of inside said internal vessel is made higher than said pressure of inside said external vessel;

and a unit to detect an internal pressure difference between said internal vessel and said external vessel thereby to detect a leak in said internal vessel.

11. The treatment apparatus for organic waste according to claim 1, further comprising:

a unit to measure hydrogen ion concentration or conductivity of said water or said hydrogen peroxide water charged in said gap between said internal vessel and said external vessel thereby to detect a leak in said internal vessel.

12. The treatment apparatus for organic waste according to claim 1, further comprising:

a line for introducing an oxidizing agent composed of air, or oxygen, or ozone into said reaction vessel in addition to a line for introducing said organic waste and water.

13. The treatment apparatus for organic waste according to claim 1, further comprising:

a frame with a pulley attached which can move horizontally;

wherein said reaction vessel is installed on said frame in a structure that when temperature rises, a thermal extension of said reaction vessel is allowed.

14. The treatment apparatus for organic waste according to claim 1, further comprising:

a tank for keeping said organic waste;

a pump for introducing said organic waste into said reaction vessel;

a tank for storing said hydrogen peroxide water;

a pump for introducing said hydrogen peroxide water into said reaction vessel;

a back pressure regulator for reducing pressure of said treated fluid;

a gas-liquid separator for separating said treated fluid into decomposed gas and decomposed liquid;

a tank for collecting said decomposed liquid; and a hood or a box having an interior that is controlled to a negative pressure;

wherein said reaction vessel, said tank for storing said organic waste, said pump for introducing said organic waste into said reaction vessel, said back pressure regulator for reducing pressure of said treated fluid, said gas-liquid separator for separating said treated fluid into decomposed gas and decomposed liquid, and said tank for collecting said decomposed liquid are installed in said hood or said box.

15. A treatment apparatus for organic waste, said treatment apparatus comprising:

a reaction vessel configured to receive and decompose organic waste, said reaction vessel being configured to discharge a treated fluid, wherein said reaction vessel includes:

an internal vessel;

an external vessel surrounding said internal vessel with a gap provided between an outer surface of said internal vessel and an inner surface of said external vessel; and an interconnection pipe fluidly interconnecting said gap and an interior of said internal vessel, and wherein said internal vessel has a heating zone configured to receive and heat said organic waste above a predetermined temperature, a reaction zone configured to decompose said organic waste at a temperature above the predetermined temperature, and a cooling zone configured to cool the treated fluid containing a decomposition product of the organic waste.

16. The treatment apparatus for organic waste according to claim 15, wherein said interconnection pipe is provided outside said external vessel.

17. The treatment apparatus for organic waste according to claim 15, wherein said gap has high-pressure water or hydrogen peroxide water provided therein, and wherein said interconnection pipe is configured to introduce said high-pressure water or hydrogen peroxide water within said gap into said interior of said internal vessel.

18. The treatment apparatus for organic waste according to claim 1, wherein said interconnection pipe is configured to introduce said high-pressure water or hydrogen peroxide water charged within said gap into said inside of said internal vessel.

* * * * *